March 12, 1963  NAOYUKI UNO  3,080,803
LIGHT MEASURING SYSTEM
Filed Sept. 7, 1961

INVENTOR.
NAOYUKI UNO
BY
Stanley Wolder
ATTORNEY

United States Patent Office 3,080,803
Patented Mar. 12, 1963

3,080,803
LIGHT MEASURING SYSTEM
Naoyuki Uno, Urawa-shi, Saitama-ken, Japan, assignor to Asahi Optical Industry Co., Ltd. (Japanese name: Asahi Kogaku Kogyo Kabushiki Kaisha), Tokyo, Japan, a corporation of Japan
Filed Sept. 7, 1961, Ser. No. 136,577
Claims priority, application Japan Jan. 16, 1961
6 Claims. (Cl. 95—10)

The present invention relates generally to improvements in light measuring systems and its relates more particularly to an improved electric built-in- exposure meter wherein the photo-sensitive element is exposed to light reflected thereto by way of a mirror.

The conventional single lens reflex camera is provided with a viewing mirror which is swingable to a position obliquely intersecting the optical axis of the comera lens whereby to premit through the lens viewing and focussing, the mirror being automatically returned to its retracted position upon the tripping or release of the camera shutter. It is primarily with a built-in exposure meter in a single lens reflex camera of the above type that the present invention is concerned. It has been previously proposed in a single lens reflex camera to locate a photosensitive element in the path of the mirror reflected light and specifically in the focal plane and within the frame of the mirror reflected image, when the camera is in its viewing condition. The photosensitive element is connected either directly or indirectly to a sensitive current meter which provides an indication of the intensity of the light incident thereon. While the above arrangement offers many advantages it possesses an important drawback which in many cases produces unsatisfactory results. The light measurement effected by this system is often inaccurate and the deviation from a true reading varies with the camera lens diaphragm opening and the ambient light conditions.

It is therefore a principal object of the present invention to provide an improved light measuring system.

Another object of the present invention is to provide an improved built-in electric exposure meter in cameras of the single lens reflex type.

Still another object of the present invention is to provide an improved single lens reflex camera provided with a built-in exposure meter actuated only by the light reflected by the mirror of the camera viewing system to furnish an accurate reading of the light which will be incident upon the film during exposure thereof.

A further object of the present invention is to provide a light measuring system of the above nature which is simple, dependable and accurate.

Figure 1:
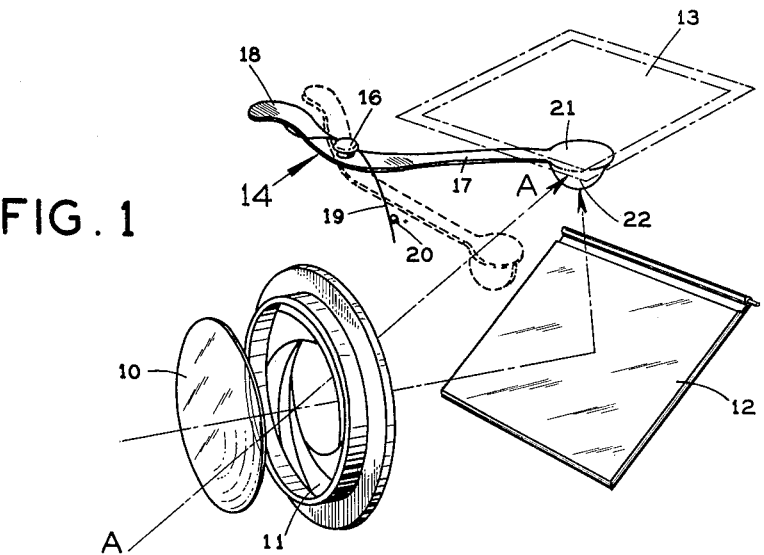
Figure 2:
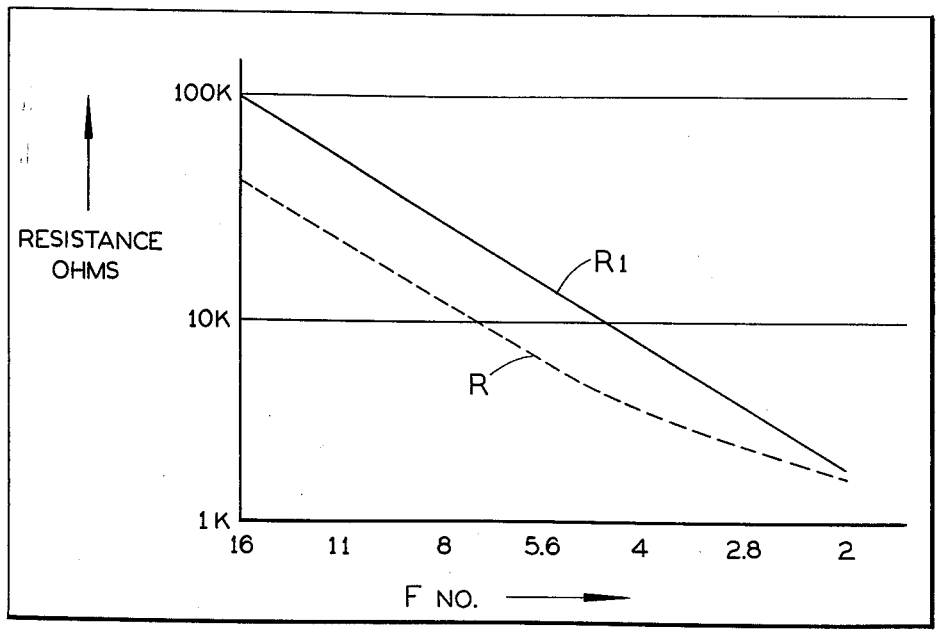

The above and other objects of the present invention will become apparent from a reading of the following description taken in conjunction with the accompanying drawing wherein:

FIGURE 1 is a perspective view of a light measuring system according to the present invention, the photosensitive element being illustrated by broken line in a retracted position; and FIGURE 2 is a graph indicating the light response of the photosensitive element at different lens diaphragm openings, without and with the improvement of the present invention.

It has been found that when a photosensitive element is located in the viewing optical system of a single lens reflex camera and particularly in the mirror reflected image, that the light incident thereon differs appreciably from the corresponding light which would be incident upon the film attendant to the exposure thereof. It has also been observed that this difference in light varies in a non-linear relationship with the variation in the opening of the camera lens diaphragm. It has been found that the aforesaid difference in the light incident on the photosensitive element and hence the response thereof is the result of light reaching the photosensitive element directly from the camera lens in addition to the mirror reflected light. The area of the frame of the film exposed to the light through the camera lens is only a fraction of the full real image projected by the camera lens, and in the case of a 35 millimeter camera the vertical dimension of the projected image which is employed is less than the horizontal dimension by reason of the corresponding dimensions of the conventional 35 millimeter frame. Similarly, the light reflected by the viewing mirror is accordingly a fraction of that projected through the camera lens and a part of the mirror unintercepted light is projected directly toward the mirror reflected fccal plane and the light sensitive element. This condition occurs with wide angle lens and telephoto lens as well as with lenses of normal focal length. As a conequence the light measurement made with the above arrangement is not a true indication of the light condition. It has been discovered that the aforesaid deficiency can be overcome by shielding the photosensitive element from all light except that reflected by the viewing system mirror.

Thus, in a sense, the present invention contemplates the provision of a light measuring system comprising an objective lens, a mirror intersecting the optical axis of said lens at an oblique angle thereto, a photosensitive element disposed in the path of light reflected by said mirror, and means shielding said photosensitive element from direct exposure to the light passing through said objective lens.

In accordance with a preferred form of the present invention as embodied in a single lens reflex camera provided with a mirror swingable between an advanced position intersecting the optical axis of the camera main lens at an oblique angle thereto and a retracted position, the photosensitive element is defined by a photoconductive cell and is mounted at the free end of a pivoted arm and swingable therewith between an advanced position substantially in the focal plane of the mirror reflected image and a retracted position. A finger piece is connected to the lever to permit the manipulation thereof, the lever and photosensitive element being spring urged to their retracted positions. The photosensitive element is connected through the conventional network to a sensitive current meter the scale of which can be observed, in the usual manner, through the camera viewing system.

Referring now to the drawing which illustrates a preferred embodiment of the present invention, the numeral 10 generally designates a camera main or objective lens which is associated with a single lens reflex camera of conventional construction including a diaphragm 11 of variable aperture located along the optical axis of the lens 10 and a mirror 12 which forms part of the camera through the lens viewing system. The mirror 12 is swingable between a normal advanced position, as illustrated, in which position it intersects the optical axis of the objective lens 10 at a 45° angle thereto and a horizontal retracted position, assuming the retracted position only during the operation of the camera shutter to expose the film. When in its advanced position, the mirror 12 reflects the image projected through the lens 10 onto a viewing screen 13 lying in the focal plane of the mirror reflected image and delineating a frame area corresponding to that of the film frame. It should be noted that part of the image projected through the objective lens 11, as typified by the ray A—A, is unintercepted by the advanced mirror 12 and is directed toward the focal plane frame 13.

The mechanism for measuring the mirror reflected light, which is a function of the lighting of the subject and the opening of the diaphragm 11, comprises a bell crank or angulated lever 14 swingably supported in a horizontal plane by a pivot pin 16 affixed to the body of the camera. The lever 14 includes an elongated arm 17 disposed within the camera body directly below the plane of the focal plane frame 13, and a finger piece defining opposite arm 18 projecting outside the camera body to permit the manipulation of the lever 14 to its advanced position. A hairpin spring 19 encircles the pin 16 and includes legs engaging the lever arm 18 and a stationary detent 20 to resiliently urge the lever 14 to its retracted position out of registry with the focal plane frame 13, as illustrated by broken line.

A photosensitive element 21 is mounted at the free end of the lever arm 17 and has a downwardly directed sensitive area. The photosensitive element 21 is advantageously a photoconductive cell such as a cadmium sulphide cell and is connected in any well known manner, for example by way of a voltage source or a solid state amplifier, to a sensitive current meter. The scale of the current meter may be calibrated directly in shutter speeds and is preferably visible with the meter indicator through the camera viewing system in the usual manner. An opaque transversely extending vertical light intercepting shield 22 depends from the free end of the lever arm 17 just forward of the photosensitive element 21 and shields the photosensitive element 21 from direct exposure to any light passing through objective lens 10 without interfering with the mirror reflected light impinging thereon when the photosensitive element 21 is in its advanced position.

In effecting a light measurement, the diaphragm 11 is set to the desired opening and the camera is directed at the subject. The finger piece 18 is pressed inwardly swinging the lever arm 17 to its advanced position carrying the light sensitive element 21 to its advanced position in registry with and substantially in the plane of the frame focal plane 13. The photosensitive element 21 is thus exposed only to the mirror reflected image and shielded from any direct light transmitted by the lens 10 to furnish a true and accurate light reading which, as aforesaid, may be read directly as a designated shutter speed. It should be noted that upon release of the finger piece 18 the lever arm 17 and the photosensitive element 21 are retracted out of registry with the mirror reflected light to minimize fatigue and depletion of the light measuring circuit and obviate interference with the movement of the swinging mirror 12.

In FIGURE 2 of the drawings there are illustrated two curves R and R1 shown by broken and full lines respectively. The curve R1 represents the variation in the resistance of a cadmium sulphide cell, supported in its advanced position and shielded in accordance with the present invention as described above, with the variation of the opening of the diaphragm 11, the light incident on the camera lens being maintained constant. The curve R represents the variation of the resistance of the same cadmium sulphide cell with variation of diaphragm opening under conditions identical to that of curve R1 except that the shield 22 has been omitted thus exposing the photosensitive element 21 to direct as well as to mirror reflected light. It is apparent from a study of the curves R and R1 that the resistance of the photosensitive element is completely different under shielded and unshielded conditions and that such differences vary with the diaphragm opening. While the curves are somewhat parallel at diaphragm openings smaller than f5.6 they converge at diaphragm openings larger than f5.6 and almost meet at a f2.8 opening. Thus the readings obtained with the unshielded photosensitive element do not truly represent the light to which the film will be exposed and vary with the lens aperture in an undesirable manner. This deficiency has been overcome by the present arrangement as demonstrated above.

While there has been described and illustrated a preferred embodiment of the present invention it is apparent that numerous alterations, omissions and additions may be made without departing from the spirit thereof.

What is claimed is:

1. A single lens reflex camera comprising an objective lens, a mirror disposed rearwardly of said objective lens and swingable between an advanced position intercepting the optical axis of said objective lens at an oblique angle thereto and a retracted position, a pivoted lever having a free end swingable between an advanced position in the path of light reflected by said mirror in its advanced position and a retracted position, a photosensitive element mounted on said lever free end and movable therewith between said advanced and retracted positions and directed toward said mirror when in an advanced position, and a light intercepting shield mounted on said lever free end and between said photosensitive element and said objective lens to shield said photosensitive element when in its advanced position from the direct rays passing through said objective lens.

2. A camera according to claim 1 including spring means normally urging said lever to its retracted position.

3. A camera according to claim 1 including a finger piece attached to said lever to permit the manipulation thereof.

4. A camera according to claim 1 wherein said advanced position of said photosensitive element is substantially at the mirror reflected focal plane of said objective lens.

5. A camera according to claim 1 wherein said photosensitive element is a photoconductive cell.

6. A camera according to claim 1 including a variable diaphragm disposed between said mirror and said objective lens.

References Cited in the file of this patent

UNITED STATES PATENTS

| 2,297,428 | Nuchterlein | Sept. 29, 1942 |
| 2,937,582 | Goshima | May 24, 1960 |

FOREIGN PATENTS

| 746,837 | Great Britain | Mar. 21, 1956 |